(12) United States Patent
Aert et al.

(10) Patent No.: US 6,800,709 B2
(45) Date of Patent: Oct. 5, 2004

(54) METHOD OF PREPARING POLYMER PARTICLES HAVING NARROW PARTICLE SIZE DISTRIBUTION

(75) Inventors: Huub Van Aert, Pulderbos (BE); Joachim Storsberg, Mainz (DE); Helmut Ritter, Mainz (DE); Christiaan Van Roost, Aartselaar (BE)

(73) Assignee: AGFA-Gevaert N.V., Mortsel (BE)

( * ) Notice: Subject to any disclaimer, the term of this patent is extended or adjusted under 35 U.S.C. 154(b) by 14 days.

(21) Appl. No.: 10/091,975

(22) Filed: Mar. 6, 2002

(65) Prior Publication Data

US 2002/0173610 A1 Nov. 21, 2002

Related U.S. Application Data

(60) Provisional application No. 60/291,997, filed on May 18, 2001.

(30) Foreign Application Priority Data

Mar. 29, 2001 (EP) ............................................. 01000099

(51) Int. Cl.$^7$ ................................................. C08F 4/30
(52) U.S. Cl. ...................... 526/229; 526/200; 526/909; 526/223; 526/319; 526/320; 526/327; 526/323.2; 526/329.7; 526/330; 526/334
(58) Field of Search ................................ 526/229, 200, 526/909, 223, 319, 320, 327, 323.2, 329.7, 330, 334

(56) References Cited

U.S. PATENT DOCUMENTS 5,276,088 A * 1/1994 Yoshinaga .................. 525/54.3
5,777,003 A * 7/1998 Haas et al. .................. 523/223

FOREIGN PATENT DOCUMENTS

EP 0 334 515 A 9/1989
EP 0710675 A2 * 10/1995
WO WO 99/40134 8/1999

OTHER PUBLICATIONS

Ritter et al "Emulsion Polymerization in the Presence of beta–Cyclodextrin" (Polymer, 40 (1999), 6673–77).*
Storsberg et al "Cyclodextrins in Polymer Synthesis: polymerization of methyl Metharcylate under Atom Transfer Conditions (ATRP) in Aqueous Solution" (Macromol. Rapid communications, 2000, 21 1342–1346).*
Bernhardt et al "Cyclodecxtrins in Polymer Synthesis" (Macromolecules, 2001, 34, 1647–1649),.*
Storsberg et al "Cyclodextrins in Polymer Synthesis: Free radical polymerization of Cyclodextrin host–guest complexes of meth methacrylate or styrene from homogeneous aqueous solutions" Macromolecules. Rapid Communication, 21, 236–41 (2000),.*
Database WPI, Week 9621, Derwent Publications Ltd., London, GB; AN 1996–20556, XP002174569 & JP 08 073537 A (Diafoil Hoechst Co. Ltd.), Mar. 19, 1996, Abstract.

* cited by examiner

*Primary Examiner*—Tatyana Zalukaeva
(74) *Attorney, Agent, or Firm*—Joseph T. Guy; Nexsen Pruet, LLC

(57) ABSTRACT

A method has been described of preparing monodisperse polymer particles by free radical polymerization or copolymerization of hydrophobic monomers in a water-based system in the presence of cyclodextrin, characterized in that said free radical polymerization is performed with semi-continuous addition of monomer, wherein said monomer is absent before initiating polymerization, and in that a total solid contents of less than 30% by weight is present in said water-based system, in order to provide monodisperse polymer particles which are very suitable for use in many applications as e.g. in inks or toners, in photonic crystal films, in thermal printing plates for computer-to-plate or computer-to-press applications, in inkjet media, in displays, in photographic films, or as a spacing agent.

16 Claims, 5 Drawing Sheets

METHOD OF PREPARING POLYMER PARTICLES HAVING NARROW PARTICLE SIZE DISTRIBUTION

The application claims the benefit of 60/291,997 filed May 18, 2001.

DESCRIPTION

1. Field of the Invention

The present invention relates to a method of preparing monodisperse polymer particles, to the said monodisperse polymer particles as such, and to applications of the said polymer particles thus prepared.

2. Background of the Invention

Cyclodextrins (further in the text referred to as "CDs") are, from a structural point of view, well known cyclic species that can solubilize hydrophobic compounds in aqueous media. The solubilization is effected by complexation of water-insoluble species within the hydrophobic cavity of the CD. The outer hydrophilic surface then interacts with water in order to maintain the solubilization of the complex. In literature several authors report on use of CDs in copolymerisation of hydrophobic monomers with water soluble monomers as has e.g. been disclosed in following references.

Cyclodextrins in Polymer Synthesis: Influence of Acrylate Side Groups on the Initial Rate of Radical Polymerisation of Various Acrylate/Methylated β-cyclodextrin Complexes in Water. Bernhardt, Stefan; Gloeckner, Patrick; Theis, Alexander; Ritter, Helmut, Macromolecules (2001), 34(6), 1647–1649.

Cyclodextrins in polymer synthesis: polymerization of methyl methacrylate under atom-transfer conditions (ATRP) in aqueous solution. Storsberg, Joachim; Hartenstein, Markus; Müller, Axel H. E.; Ritter, Helmut. Macromol. Rapid Commun. (2000), 21(18), 1342–1346.

Cyclodextrins in polymer synthesis: free radical polymerization of methylated β-cyclodextrin complexes of methyl methacrylate and styrene, controlled by dodecane thiol as the chain-transfer agent in aqueous medium. Glöckner, Patrick; Ritter, Helmut, Macromol. Chem. Phys. (2000), 201(17), 2455–2457.

Carbohydrate/Monomer Complexes in Aqueous Polymerisations: Methylated-β-cyclodextrin Mediated Aqueous Polymerisation of Hydrophobic Methacrylic Monomers. Madison, Phillip H.; Long, Timothy E, Biomacromolecules (2000), 1(4), 615–621.

Methylated-β-cyclodextrin mediated aqueous polymerization of hydrophobic methacrylic monomers. Madison, Phillip H.; Long, Timothy E., Polym. Prepr. (Am. Chem. Soc., Div. Polym. Chem.) (2000), 41(2), 1836–1837.

Cyclodextrins in Polymer Synthesis: Free Radical Copolymerization of Methylated β-Cyclodextrin Complexes of Hydrophobic Monomers with N-Isopropylacrylamide in Aqueous Medium. Casper, Patrick; Glöckner, Patrick; Ritter, Helmut. Macromolecules (2000), 33(12), 4361–4364.

Cyclodextrins in polymer synthesis: free radical polymerisation of cyclodextrin host-guest complexes of methyl methacrylate or styrene from homogeneous aqueous solution. Storsberg, Joachim; Ritter, Helmut. Macromol. Rapid Commun. (2000), 21(5), 236–241.

Manufacture of polymers by radical polymerization of water-insoluble monomers in aqueous medium. Schornick, Gunnar; Kistenmacher, Axel; Ritter, Helmut; Jeromin, Julia; Noll, Olaf; Born, Markus. (BASF A. -G., Germany) in DE-OS 19533269 A1.

Reports related with use of CDs in heterogeneous reactions, such as emulsion polymerizations or dispersion polymerizations, are scarce. A few references are enclosed below.

Rimmer e.g. (references given hereinafter) describes use of cyclodextrins in a batch-wise emulsion polymerization: in some cases he makes use, besides cyclodextrin, of an anionic surfactant (as e.g. Dowfax 2A1). In other heterogeneous polymerizations where cyclodextrins are used, such as patents from Willy Lau et al. or Reinhold Leyrer et al., considerable amounts of anionic surfactants are always used, such as sodium dodecyl sulphate, dodecyl benzene sulphonic acid sodium salt, Rhodapex CO-436 (sodium salt of sulphated polyethoxynonylphenol), Triton XN-45S or Dow fax (sulphonated alkyl diphenyl oxide). From the present invention it will become clear that a batch-wise procedure and presence of additional anionic surfactants are undesirable in view of the objects to be attained. A few references where this has not been taken into account are:

Cyclodextrins in the emulsion polymerization of vinyl monomers. Rimmer, S., Macromol. Symp. (2000), 150 (Polymers in Dispersed Media), p. 149–154.

Emulsion polymerizations in the presence of β-cyclodextrin. Rimmer, S.; Tattersall, P. I. Polymer (1999), 40(24), 6673–6677.

Preparation of polymers by aqueous polymerization. Lau, Willie (Rohm and Haas Company, USA); EP-A 0 710 675.

Preparation of fluorinated polymers. Parker, Hsing-Yeh; Lau, Willie; Rosenlind, Erik Sigurd (Rohm and Haas Company, USA); EP-A 0 890 592.

Preparing polymers by emulsion polymerization in the presence of compounds capable of forming a supermolecular structure. Leyrer, Reinhold; Mathauer, Klemens; Roser, Joachim; Wildburg, Gerald; Haunschild, Alexander (BASF A. -G., Germany); EP-A 0 780 401.

Moreover those reports are all related with use of CDs in heterogeneous reactions, wherein polymer particles having a heterogeneous particle size distribution are obtained, whereas use of polymer particles having a narrow particle size distribution are highly desired.

SUMMARY OF THE INVENTION

It is an object of the present invention to make use of cyclodextrin in heterogeneous polymerization reactions, such as emulsion polymerizations or dispersions polymerizations, in order to obtain a more narrow particle size distribution.

It is furthermore an object of the present invention to provide a method in order to perform the cyclodextrin mediated heterogeneous polymerization reaction, thereby getting a much better colloidal stability of particles having a more narrow particle size distribution.

Moreover it is an object of the present invention to perform the cyclodextrin mediated heterogeneous polymerization in order to obtain no nucleation from different types of micelles.

Still another object of the present invention is to give the formed latex additional stability.

It is an ultimate object of the present invention to get monodisperse polymer particles which are applicable in quite a lot of diverse well-known and novel applications in order to broaden the scope of applicability.

Further advantages and embodiments of the present invention will become apparent from the description following hereinafter.

As a result of our investigations a method has been described of preparing monodisperse polymer particles by free radical polymerization or copolymerization of hydrophobic monomers in a water-based system in the presence of cyclodextrin, characterized in that said free radical polymerization is performed with semi-continuous addition of monomer, wherein said monomer is absent before initiating polymerization, and in that a total solid contents of less than 30% by weight is present in said water-based system. Monodisperse polymer particles thus prepared have been shown to be very suitable for use in many applications as e.g. in inks or toners, in photonic crystal films, in thermal printing plates for computer-to-plate or computer-to-press applications, in inkjet media, in displays, in photographic films, or as spacing agent.

BRIEF DESCRIPTION OF THE DRAWINGS
(SEM Pictures)

DETAILED DESCRIPTION OF THE INVENTION

Figure 1:
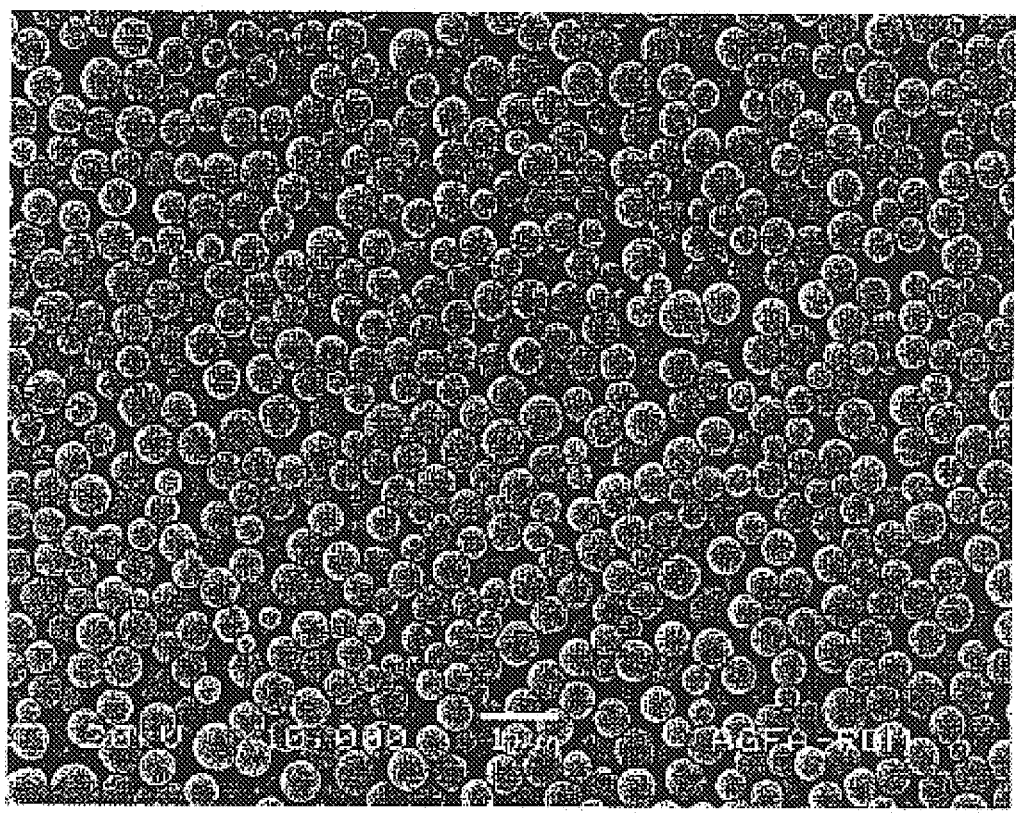
FIG. 1 shows polystyrene latex particles, obtained in comparitive example 5, without presence of cyclodextrin.
Figure 2:
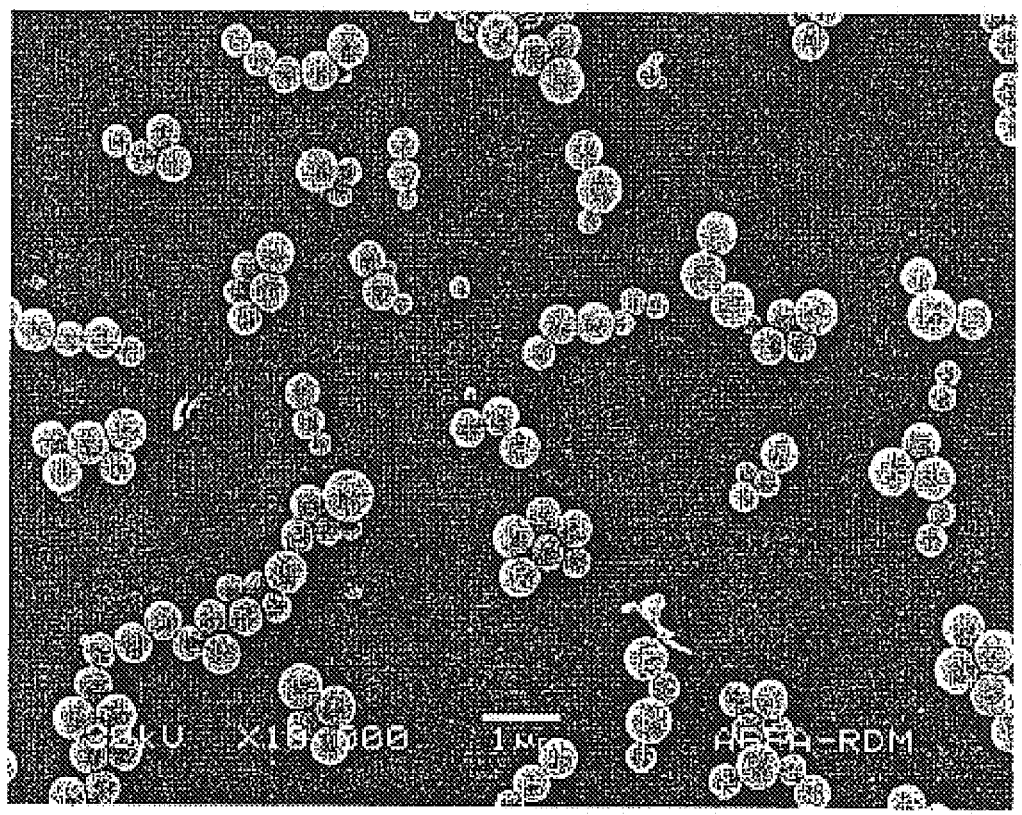
FIG. 2 shows same polystyrene latex particles as in FIG. 1, but after further dilution with water.
Figure 3:
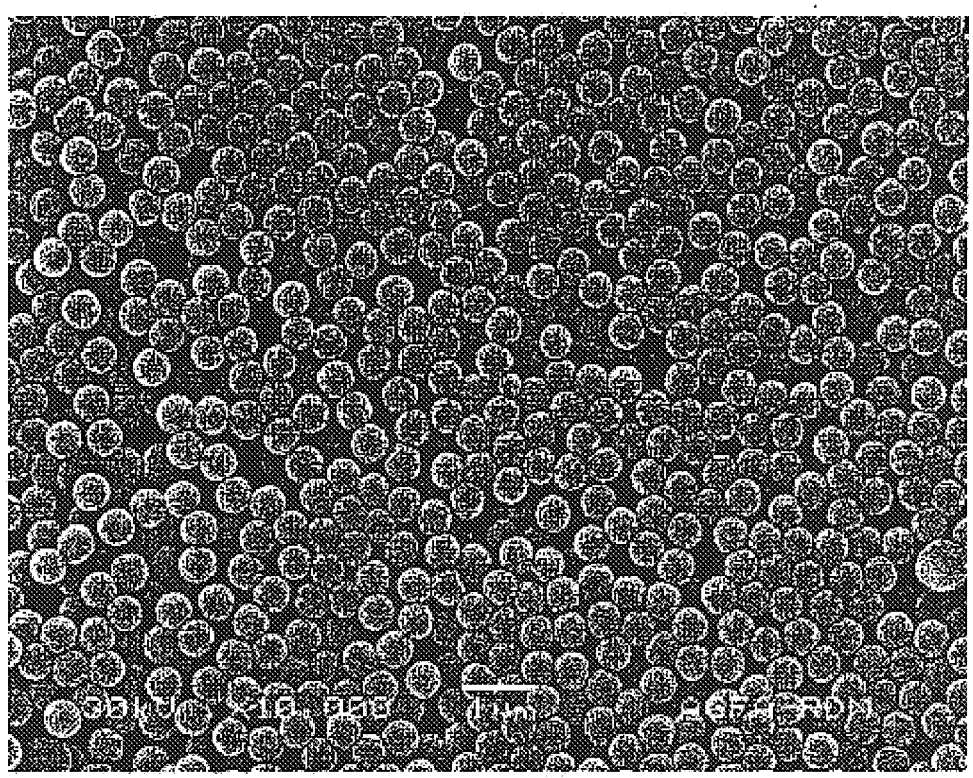
FIG. 3 shows polystyrene latex particles, obtained in inventive example 6, in the presence of 5.6 wt % of cyclodextrin.
Figure 4:
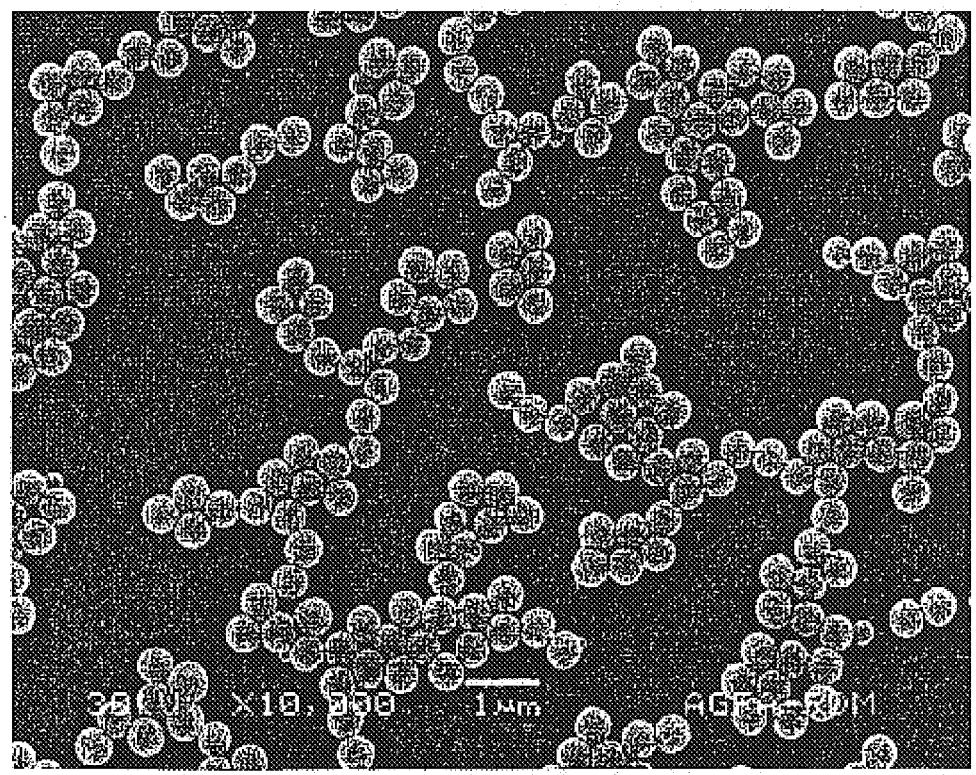
FIG. 4 shows same polystyrene latex particles as in FIG. 3, but after further dilution with water.
Figure 5:
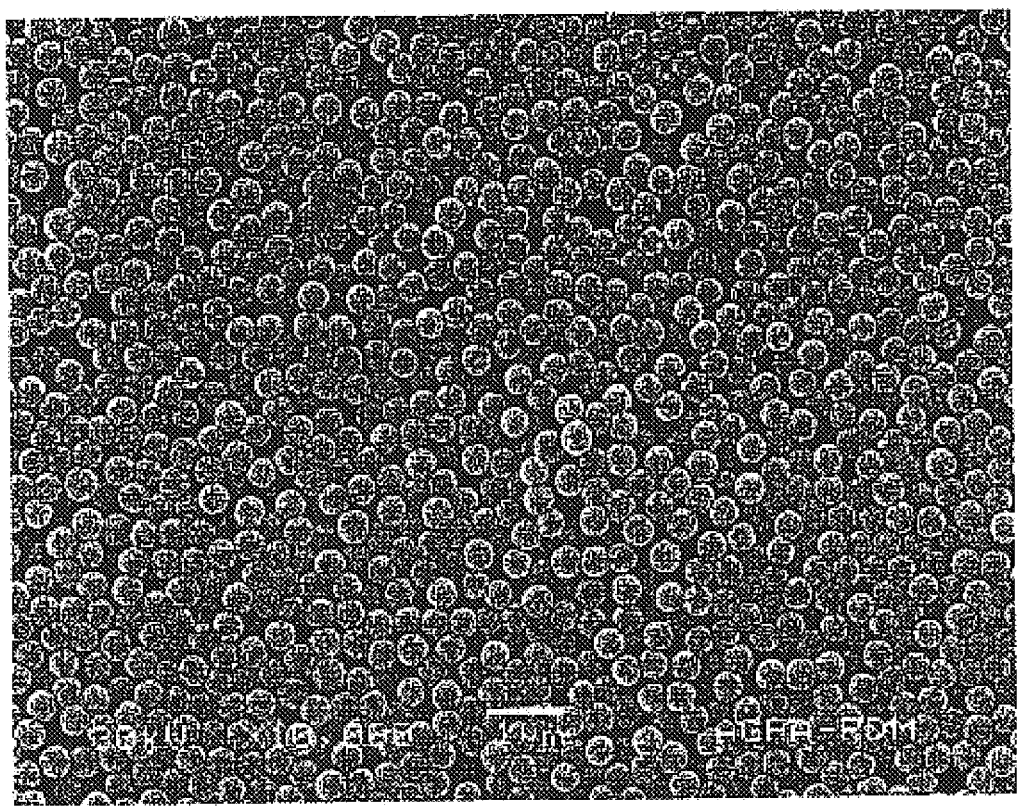
FIG. 5 shows polystyrene latex particles, obtained in inventive example 7, in the presence of 11.1 wt % of cyclodextrin (see also abstract).
Figure 6:
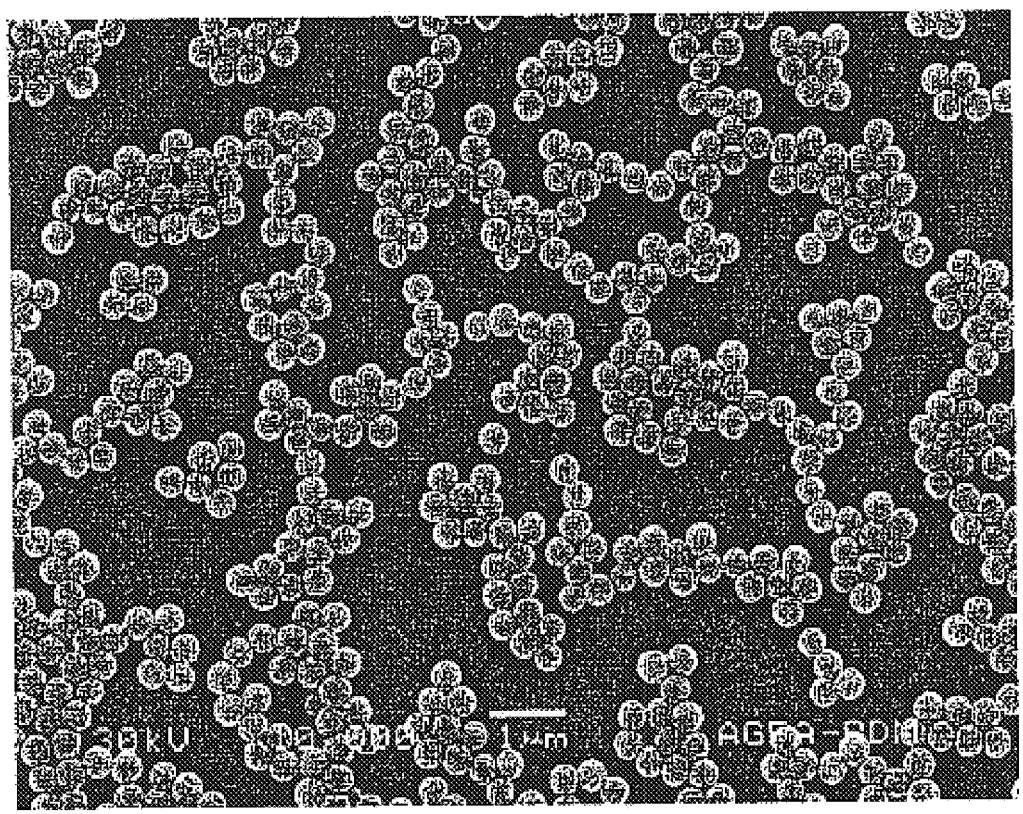
FIG. 6 shows same polystyrene latex particles as in FIG. 5, but after further dilution with water.
Figure 7:
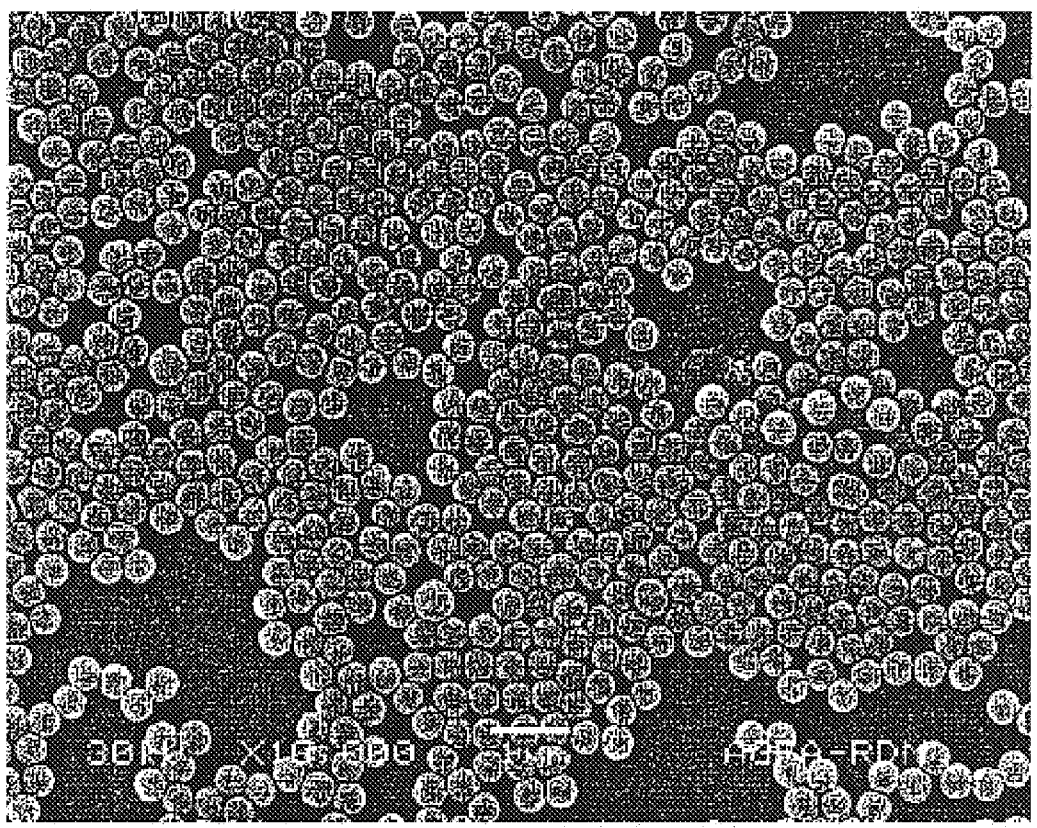
FIG. 7 shows polymethylmethacrylate latex particles, obtained in inventive example 2, in the presence of 5.3 wt % of cyclodextrin.
Figure 8:
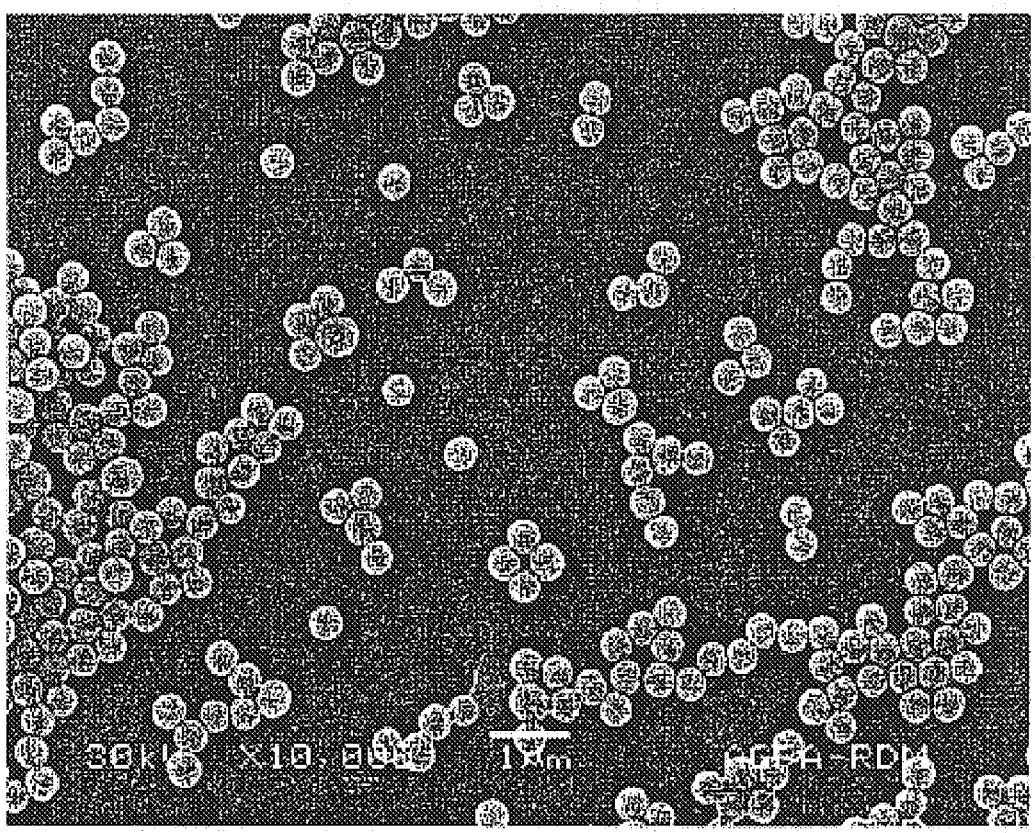
FIG. 8 shows same polymethylmethacrylate latex particles as in FIG. 7, but after further dilution with water.
Figure 9:
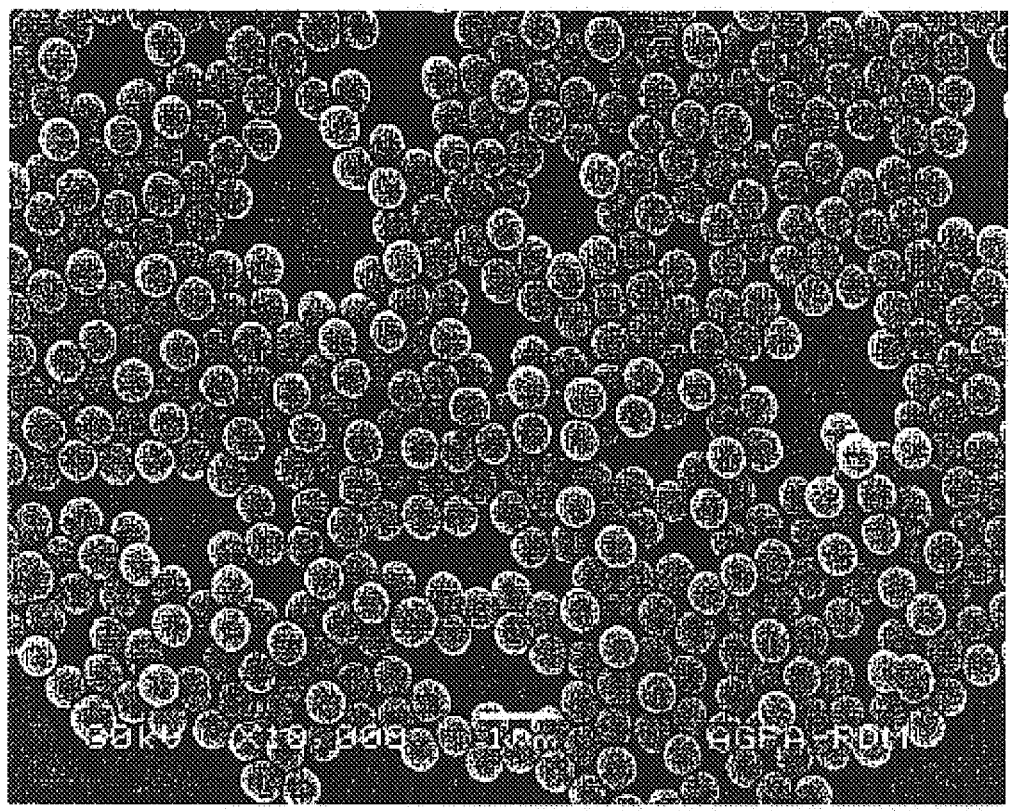
FIG. 9 shows polymethylmethacrylate latex particles, obtained in inventive example 3, in the presence of 10.6 wt % of cyclodextrin.
Figure 10:
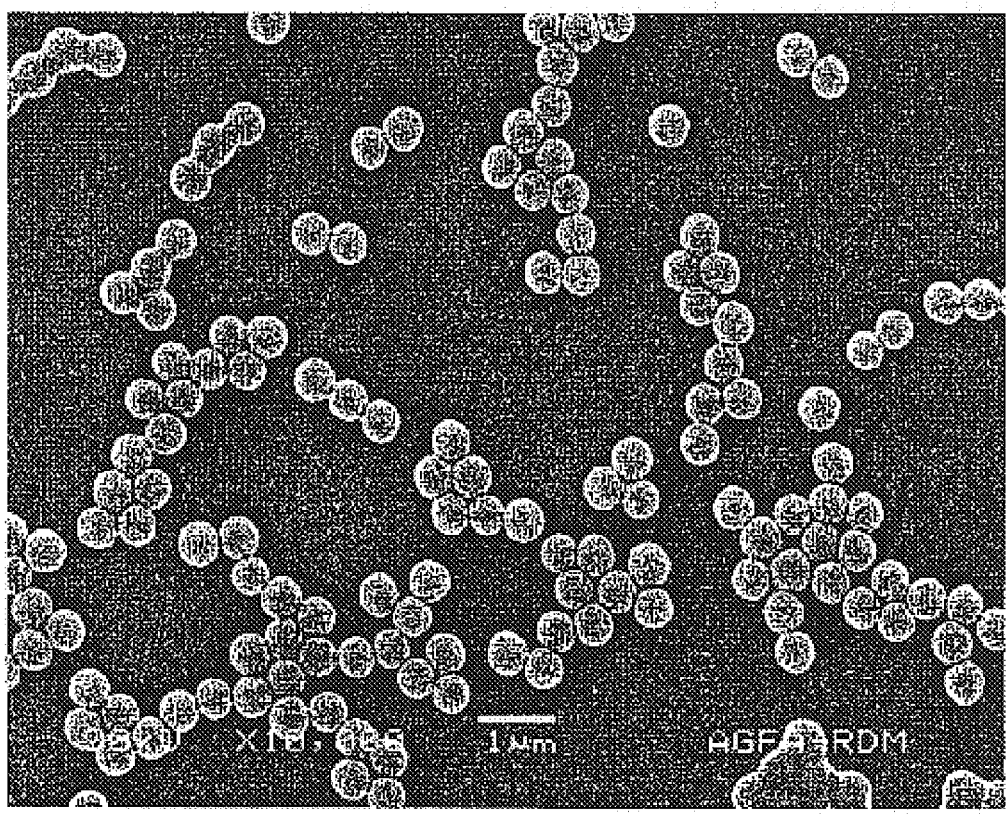
FIG. 10 shows same polymethylmethacrylate latex particles as in FIG. 9, but after further dilution with water.

According to the present invention it has been shown to be particular advantageous to prepare said monodisperse polymer particles by free radical polymerization or copolymerization of hydrophobic monomers in a water-based system in the presence of cyclodextrin, wherein said free radical polymerization is performed with semi-continuous addition of monomer, wherein said monomer should be absent before initiating polymerization, and in that a total solid contents of less than 30% by weight is present in said water-based system throughout the preparation method. According to one embodiment of the method of the present invention as disclosed herein, monodisperse polymer particles are prepared by a free-radical polymerization initiated by a persulfate initiator. All cyclodextrin as required is preferably added to the reactor before starting the polymerization reaction. In a preferred embodiment according to the present invention said monodisperse polymer particles are prepared by free radical polymerization or copolymerization of hydrophobic monomers in a water-based system in the presence of β-cyclodextrin.

Preferably all monomer to be used or a large fraction thereof is added semi-continuously. This gives a high initial CD/monomer ratio, which enables a fast complexation. These complexes might form aggregates, which can become polymerization sites or loci. Furthermore, no or hardly any monomer droplets are present and can approach the micelles formed from the CD-monomer complexes. Whereas in the absence of CD only homogeneous nucleation could occur, micellar nucleation also becomes important now. CD, in all steps of the preparation method, clearly contributes to an improvement of the colloidal stability of the particles: formation of stable micelles and micellar nucleation attributes to a fast nucleation and to formation of stable colloidal particles with a narrow particle size distribution.

It should be clear that, opposite to the method described in EP-A 0 334 515, the lower total solid contents in the reaction vessel, should be less than 30% by weight.

Apart from that in the method of the present invention, all monomer is added semi-continuously and no monomer is added before the reaction is initiated. If, opposite to the method of the present invention, monomers were already present at the beginning when initiating the reaction, a much higher amount of coagulum would be found (the more for higher monomer concentrations), just as in batch reactions, wherein accordingly up to more than 10% of coagulum is found (see e.g. S. Rimmer et al., Polymer (1999), 40(24), 6673–6677, mentioned hereinbefore). Moreover the method of the present invention differs from the one described in EP-A 0 334 515 in that said free-radical polymerization is not initiated, even not optionally, by use of a redox initiator as peroxide, if present therein, but by a persulfate initiator alone.

Unexpectedly the nucleation step known from the classical "Harkins model" for emulsion polymerization becomes shorter, whereby all sites are thought to be initiated at approximately the same time in order to grow to the same unimodal particle size, resulting in a monodisperse particle distribution.

In this patent application preferred use of cyclodextrins in a semi-continuous emulsion polymerization, i.e. by a method wherein addition of monomer is performed semi-continuously, is thus disclosed as an essential feature, whereas the emulsion polymerizations as performed e.g. by Rimmer (reference given hereinbefore) were performed in a batch procedure. In the present invention a semi-continuous addition of the monomer gives stable latexes without severe coagulation as will further be illustrated in the Examples.

The obtained particles unexpectedly have an extremely narrow particle size distribution. In a preferred embodiment according to the method of the present invention, the emulsion polymerization is performed surfactant-free, i.a. in the absence of addition of any surfactant, and, more particularly, in the absence of any ionic surfactant. Moreover latexes are only stabilized by sulphate end-groups derived from the persulphate initiator and by the presence of the CD.

The advantage of a semi-continuous addition over a batch-wise procedure, might be explained by a different particle nucleation mechanism. Consequently a more narrow particle size distribution is obtained. The complex of the hydrophobic monomer with a CD might form aggregates (micelles) which can act as polymerization sites or loci. This complexation and subsequent aggregation of the complex will depend on type of depend on the type of CD and type of monomer used.

Polymerization is proposed to occur in the hydrophobic centre of the micelle (micellar nucleation). Furthermore whereas in the absence of CD only homogeneous nucleation may occur (in case of emulsion polymerization free from a surfactant), now also micellar nucleation can occur simultaneously. The number of particles becomes affected thereby, and, consequently, its particle size. It can further be expected that the stability of micelles composed of these "CD-(oligo)styrene complexes" have a much higher stability, if compared e.g. with a traditional anionic surfactant. Taking into consideration the classical "Harkins model" (W. D. Harkins, J. Am. Chem,. Soc., 69, 1428 (1947)) of emulsion copolymerisation, divided into three intervals, the nucleation stage (interval I) is expected to be shorter. Consequently all particles are formed in a short time and become more monodisperse. The model as set out herein was confirmed by a faster formation of a turbid solution (as a consequence of latex formation): performance of the reaction in a semi-continuous way makes the effect of the described micellar nucleation to be much more important than in a batch process.

From the results obtained it can be concluded that not only a more homodisperse particle size is obtained in most cases, but that a smaller molecular weight distribution is moreover obtained, thus supporting propositions made about the influence of CDs on a particle nucleation mechanism.

Another explanation why particle size distributions become narrower may be that the "CD-monomer complex" acts as a polymerizable surfactant (called "surfmer"). Use of polymerizable surfactants for monodisperse latexes is well-known from many references:

Emulsion polymerization of styrene with surface-active monomer. Malyukova, E. B.; Nesmelova, S. V.; Gritskova, I. A.; Pravednikov, A. N.; Egorov, V. V.; Zubov, V. P.; Kabanov, V. A. Dokl. Akad. Nauk SSSR (1985), 284(6), 1420–2 [Phys. Chem.].

Kinetics and mechanism of emulsifier-free emulsion polymerization: styrene/surface active ionic comonomer system. Chen, Showan; Chang, Herngshow. J. Polym. Sci., Polym. Chem. Ed. (1985), 23(10), 2615–30.

Synthesis of Monodisperse Polystyrene Microlatexes by Emulsion Polymerisation Using a Polymerizable Surfactant; Liu, J.; Chew, C. H.; Gan, L. M.; Teo, W. K.; Gan, L. H. Langmuir (1997), 13(19), 4988–4994.

From literature, listed below, it was also shown that polysoaps can give monodisperse particles, if compared with traditional surfactants. Oligomer-CD or polymer-CD complexes can have an similar effect.

Emulsion Polymerization of Styrene Using Conventional, Polymerizable, and Polymeric Surfactants. A Comparative Study. Cochin, D.; Laschewsky, A.; Nallet, F. Macromolecules (1997), 30(8), 2278–2287.

Preparation and stability of polystyrene latexes using polysoaps as emulsifiers. Yang, Yajiang; Engberts, Jan B. F. N. Dep. Org. Chem., Univ. Groningen, Groningen, Neth.Eur.Polym.J.(1992),28(8), 881–6.

Preparation of monodisperse stable poly(methyl methacrylate) latex in the absence of surfactants. Yamazaki, Shinsuke; Hamashima, Motome; Ishigami, Yutaka. Natl. Chem. Lab. Ind., Tokyo, Japan. Kobunshi Ronbunshu (1976), 33(9), 549–57.

According to the method of the present invention the polymerization reaction is performed without the addition of any additional surfactant. I.a. addition of any ionic surfactant was avoided, in contrast to Rimmer et al. (see Rimmer, S.; Tattersall, P. I. Polymer (1999), 40(24), 6673–6677)). Presence of anionic surfactants may cause different types of micelles to be present, e.g. micelles composed of CD-monomer complexes and micelles composed of anionic surfactants. Consequently, particle nucleation can occur from different types of micelles, yielding a more heterogeneous particle size distribution. Furthermore as has been shown in various studies surfactant-free emulsion polymerizations are preferred in order to obtain more homodisperse particles, resulting in monodisperse or homogeneous particle size distributions. Following references are illustrative therefor:

Monodispersed polymer particles with micron-size by emulsifier-free emulsion polymerization. Zhu, Shixiong; Du, Jinhuan; Jin, Xigao; Chen, Liusheng. Gaofenzi Xuebao (1998),(1), 118–123.

Preparation of large monodisperse polystryrene particles by a one-step surfactant-free emulsion polymerization. Tuin, G.; Peters, A. C. I. A.; van Diemen, A. J. G.; Stein, H. N. J. Colloid Interface Sci. (1993), 158(2), 508–10.

If, however, a surfactant is used, the choice of an anionic surfactant also influences the particle size distribution to a large extent as has been described by Feeney et al. (The determinants of latex monodispersity in emulsion polymerizations. Feeney, P. John; Napper, Donald H.; Gilbert, Robert G.; Dep. Phys. Chem., Univ. Sydney, Sydney, Australia. J. Colloid Interface Sci.(1987),118(2), 493–505). As already clearly taught before: cyclodextrin-mediated emulsion polymerizations are performed by a completely surfactant-free procedure in the method according to the present invention.

Furthermore, a surfactant may be complexed by cyclodextrin and this competes with the monomer.

Another very important advantage attained by performing the method according to the present invention consists in performance of emulsion polymerization in the presence of cyclodextrins in a semi-continuous way. According to the method of the present invention an aqueous solution of cyclodextrin is made before. The persulphate initiator is added thereto and the mixture is heated up to the polymerization temperature. Monomer is further added semi-continuously: from the first drop of monomer added to the aqueous CD solution, complexation occurs immediately and less free monomer will be present, due to the large excess of CD. Opposite thereto in a batch process no large excess of cyclodextrin is present and more of the free monomer will be present. Furthermore in a batch process many large monomer droplets may be present, which might dissolve the freshly formed micelles. Monomer droplets can thus easily approach the formed micelles and subsequently destroy them. Furthermore since a continuous addition of monomer encounters a relative high monomer/"surfactant" (surfactant=monomer–CD complex), particle sizes become smaller.

According to the method of the present invention monodisperse polymer particles having an average particle size between 0.02 µm and 20 µm are obtained. In that range, on one hand, very fine monodisperse particles having an average particle size of from 0.02 µm up to 1.0 µm, and more preferably from 0.04 µm up to 0.55 µm are desired, while at the other hand, larger monodisperse polymer particles having an average particle size of from 1.0 µm up to less than 15.0 µm are preferred.

Besides making use of the said semi-continuous monomer addition, it is advisable to perform the polymerization reactions in conditions wherein solids contents are not too high: most preferred are polymerizations at solids contents of not more than 10 wt %.

According to the present invention, besides emulsion polymerization techniques free from surfactants, seeded emulsion polymerizations are preferred in order to obtain monomodal particle size distributions. Such seeded emulsion polymerizations can also be performed in the presence of CD.

Size control of polystyrene beads by multistage seeded emulsion polymerisation. Shim, Sang-Eun; Cha, Yoon-Jong; Byun, Jae-Man; Choe, Soonja. J. Appl. Polym. Sci. (1999), 71(13), 2259–2269.

Advantages resulting from seeded emulsion polymerizations are related with absence of the requirement to have good complexation of all suitable monomers with CD. So e.g. use for the seed formation of a selected monomer which gives a good complexation with a cyclodextrin, while selecting another monomer for the shell is not excluded as there is no need for the other monomer used in the particle shell to show a very high complexation constant with CDs.

Suitable cyclodextrins for complexation are e.g. unsubstituted cyclodextrins or their ester-, alkyl-, ether-, hydroxyalkylether-, alkoxycarbonylalkylether-, carboxyalkylether-, sulfate-, phosphate-, alkoxysulfate ether-, alkoxysulphonic acid ether-, alkoxysulfonate ether-derivatives, and salts thereof.

Cyclodextrins are cyclic hexa-, hepta- or octa-amyloses with 6,7 or 8 1,4-linked glucose-units.

As an alkyl component for the cyclodextrin alkyl ether, hydroxyalkyl ether, alkoxy-carbonyl alkyl ether, carboxyalkyl ether, sulfonate alkyl ether one can choose linear or branched alkyl groups with 1 to 30 C-atoms.

Suitable cyclodextrins are α-, β- and γ-cyclodextrins, their sulfates, phosphates, and their ester-, alkyl ether-, hydroxyalkyl ether-, alkoxycarbonyl alkyl ether-, sulfonate alkyl ether- and carboxyalkyl ether-derivates and salts thereof. Very suitable cyclodextrins are e.g. methyl-α-cyclodextrin, methyl-β-cyclodextrin, methyl-γ-cyclodextrin, ethyl-β-cyclodextrin, butyl-α-cyclodextrin, butyl-β-cyclodextrin, butyl-γ-cyclodextrin, 2,6-dimethyl-α-cyclodextrin, 2,6-dimethyl-β-cyclodextrin, 2,6-dimethyl-γ-cyclodextrin, 2,6-diethyl-β-cyclodextrin, 2,6-dibutyl-β-cyclodextrin, 2,3,6-trimethyl-α-cyclodextrin, 2,3,6-trimethyl-β-cyclodextrin, 2,3,6-trimethyl-γ-cyclodextrin, 2,3,6-trioctyl-α-cyclodextrin, 2,3,6-trioctyl-β-cyclodextrin, 2,3,6-triacetyl-α-cyclodextrin, 2,3,6-triacetyl-β-cyclodextrin, 2,3,6-triacetyl-γ-cyclodextrin, (2-hydroxy)propyl-α-cyclodextrin, (2-hydroxy)propyl-β-cyclodextrin, (2-hydroxy)propyl-γ-cyclodextrin, partially or peracetylated, methylated and succinylated α-, β- and γ-cyclodextrin, 2,6-Dimethyl-3-acetyl-β-cyclodextrin und 2,6-dibutyl-3-acetyl-β-cyclodextrin, randomely methylated α-, β- and γ-cyclodextrin, randomly or selective sulfopropylated- or sulfobutylated α-, β- and γ-cyclodextrin.

Methods for synthesizing cyclodextrins and derivatives thereof are well-known and have been described e.g. in "Römpp Lexikon Chemie", 10th Edition, Stuttgart/New York 1997, S. 845 ff and in "Chemical Reviews", 98 (1998), 1743 ff. Methods for the preparation of e.g. sulfoalkyl ether cyclodextrins have been described by Stella and Rajewski in U.S. Pat. No. 5,134,127 and by Wenz and Höfler, Carbohydrate Research 322(1999),153–165.

According to the method of the present invention hydrophobic monomer are compounds selected from the group consisting of styrenics, acrylonitrile, methacrylonitrile, acrylates, methacrylates, methacryl amides, acrylamides, maleimides; vinyl ethers, vinyl esters, monoalkylmaleates, dialkyl maleates, fluorinated acrylates, fluorinated methacrylates and derivatives thereof and more particularly, said hydrophobic monomer is a compound selected from the group consisting of styrene, methylmethacrylate, vinylacetate, vinyl versate, N-phenyl maleimide, divinylbenzene, ethyleneglycol diacrylate, 2,2,2-trifluoroethylacrylate, 2,2,2-trifluoroethyl methacrylate, vinylcaprolactam, acrylonitrile, vinyl acetate, N-benzyl methacrylamide, N-benzyl maleimide and vinyl versatate.

Typical hydrophobic monomers suitable for use in CD mediated homo- or copolymerizations are summed up hereinafter: styrene, methyl methacrylate, α-methyl-styrene, vinylcaprolactam, benzylacrylate, isobornylacrylate, phenyl methacrylate, para-methyl styrene, para-tert.-butyl styrene, dimethyl 2-methylene-4,4-dimethylglutarate, 4-methyl-2,4-diphenyl-1-pentene, cyclohexyl methacrylate, furfuryl acrylate, 2-(perfluoro-octyl)ethyl acrylate, 2-(perfluorohexyl)ethyl acrylate, 2-(perfluoro-octyl)ethyl] methacrylate, trifluoroethyl acrylate, trifluoro-ethyl methacrylate, 1H,1H,2H,2H-perfluorodecyl α-fluoroacrylate, 1H,1H,2H,2H-perfluorodecyl-chloroacrylate, 1H,1H,2H,2H-perfluorodecyl methacrylate, 1H,1H,2H,2H-perfluorodecyl acrylate, 1,1,2,2-tetrahydroperfluorodecyl acrylate, 2-(perfluoroalkyl)ethyl methacrylate, methacrylic acid 3,3,4,4,5,5,6,6,7,7,8,8,8-tridecafluorooctyl ester, 1H,1H,2H,2H-perfluorododecyl methacrylate, 1,1,2,2-tetrahy-droperfluorodecyl acrylate, lauryN,N-dialllylacrylamide, cinnamyl methacrylate, chloromethylstyrene, 4-tert-butoxystyrene, sec.-butyl acrylate, sec.-butyl methacrylate, chloroprene, N,N-dimethyl methacrylamide, N,N-dimethyl acrylamide, N,N-diethyl methacrylamide, N,N-diethyl acryl-amide,ethylene glycoldiacrylate, 4-hydroxybutyl acrylate, 4-hydroxy-butyl methacrylate, lauryl methacrylate, lauryl acrylate, ethyl methacrylate, 2-ethylhexyl acrylate, benzylmethacrylate, benzyl acrylate, n-propyl acrylate, iso-propyl acrylate, butadiene, 2-ethylhexyl methacrylate, 2-propenoic acid 3,3,4,4,5,5,6,6,7,7,8,8,9,9,10,10,11,11,12,12,12-heneicosafluorododecyl ester, 1,1,2,2-tetrahydroperfluorooctyl acrylate, octadecyl acrylate, butylmethacrylate, butylacrylate, isoprene, n-hexyl acrylate, vinylidene difluoride, N-isoproylacrylamide, tert.-butylacrylamide, divinylbenzene, ethyeleneglycol, N-phenyl maleimide, N-ethyl maleimide, acrylontirle, methacrylonitrile, dimethacrylatedimethyl-aminoethyl methacrylate, phenylthioethyl acrylate, 1-adamantyl methacrylate, dodecylacrylate, ethylacrylate, ethylmethacrylate, 4-(2,5-dihydro-2,5-dioxo-1H-pyrrol-1-yl)-N-2-thiazolylbenzenesulfonamide, vinyl cinnamate, 4-methacryloyloxy) chalcone, N-vinyl carbazole, 4-(2,5-dihydro-2,5-dioxo-1H-pyrrol-1-yl)-N-phenyl-benzenesulfonamide, 4-(2,5-dihydro-2,5-dioxo-1H-pyrrol-1-yl)benzenesulfonamide, 4-(2,5-dihydro-2,5-dioxo-1H-pyrrol-1-yl)-N-2-thiazolylbenzenesulfonamide, 4-(2,5-dihydro-2,5-dioxo-1H-pyrrol-1-yl)-N-(4,6-dimethyl-2-pyrimidinyl)benzenesulfonamide, 2-methoxy styrene, N-[[4-(2,5-dihydro-2,5-dioxo-1H-pyrrol-1-yl)phenyl]sulfonyl]acetamide, 2-(2-methyl-1-oxo-2-propenyl)-1H-Isoindole-1,3(2H)-dione, 4-(2,5-dihydro-2,5-dioxo-1H-pyrrol-1-yl)benzenesulfonamide, 2-hydroxyphenyl 2-methyl-2-propenoate, vinyl trimethoxysilane, methacryloxypropyl trimethoxysilane, vinyltriisopropoxysilane, methacryloxypropyl triisopropoxysilane, dialkylmaleates, monoalkylmaleates, vinyl esters based on versatic acid, vinyl amides, tert.-butyl acrylate, tert.-butyl methacrylate, monoalkyl fumarates, dialkyl fumarates, methyl 2-cyanoacrylate, pentaerythritol tetraacrylate, pentaerythritol tetramethacrylate, pentaerythritol triacrylate, pentaerythritol triallyl ether, pentafluorophenyl acrylate, pentaflourophenyl methacrylate, 2-phenoxyethyl acylate, 2-phenylethyl methacrylate, 1,4-phenylene diacrylate, 1,3-phenylene diacrylate, tetraethylene glycol dimethacrylate, tetrahydropyranyl methacrylate, 1,3-xylene bis acrylamide, allyl methacrylate, bisphenol A dimethacrylate, N-benzyl methacrylamide, N-benzyl maleimide, cyclohexyl acrylate, cyclohexyl methacrylate.

Emulsion or dispersion polymerizations in the presence of cyclodextrins may also be controlled or 'living radical' polymerizations, using techniques such as atom transfer radical polymerization (ATRP), RAFT (reversible addition-fragmentation chain transfer polymerization), MADIX (reversible addition-fragmentation chain transfer process, using a transfer active xanthate), catalytic chain transfer (e.g. using cobalt complexes), group transfer polymerization, or nitroxide (e.g. TEMPO) mediated polymerizations.

It is clear that the monodisperse polymer particles, prepared according to the method of the present invention, are claimed as such, as well as in the applications wherein advantageous use of the said monodisperse polymer particles is made as will become clear from a variety of applications set out hereinafter. Those monodisperse polymer particles in polymer latex form, as described further in the present invention indeed have numerous applications, without however being limited thereto.

A first important application is use thereof in lithographic printing plates, in particular in computer-to-plate or computer-to-press thermal printing plates. Various plates thereof are based on latex coalescence, e.g. described in the following patents listed below. It is obvious that particle coalescence is also largely affected by the particle size distribution.

Heat-sensitive imaging element for producing lithographic plate. Vermeersch, Joan; Van Damme, Marc; Kokkelenberg, Dirk. (Agfa-Gevaert N.V., Belgium), EP-A 0 931 647, published Jul. 28, 1999.

Heat-sensitive imaging element for making lithographic printing plate comprising polymer particles with specific particle size. Van Damme, Marc; Vermeersch, Joan; Louwet, Frank; Samijn, Raf. (Agfa-Gevaert N.V., Belg). EP-A 0 849 091, published Jun. 24, 1998.

Preparation of monodisperse latexes is important in coating application, since the particle size distribution influences film formation and shear stability as e.g. described by Eckersley et al. (Synthesis of monodisperse film-forming latexes. Eckersley, S. T.; Vandezande, G.; Rudin, A J. Oil Colour Chem. Assoc. (1989), 72(7), 273–5.). For graphical applications this is important in layers where latexes are used as a binder e.g. in backing layers, in emulsion layers, in adhesive layers and in top coatings.

Another application is related with use of polymer particles obtained by the method of the present invention in ink-jet media. Using monodisperse latexes results in particle packing which is adjusted more easily. This is important e.g. when these polymer latexes are used for improving scratch resistance and water-resistance by heating and fusing the polymer particles containing ink-jet layers. Using unimodal particle sized particles in ink-jet layers also improves gloss. References wherein polymer pigments are used in ink-jet receptive coatings are following:

Process of water-resistant and durable ink-jet substrate with plastic pigment. Mets, Jeanlynn; Hong, Yaoliang; Koenig, Mike; Tomimasu, Hiroshi; Yang, Jerry. (International Paper Company, USA). WO 00/72984, published Dec. 7, 2000.

Ink-jet recording sheet with high ink absorbency and glossy surface. Ushiku, Masayuki; Mochizuki, Yoshihiro. (Konica Co., Japan). JP-A 09-156206, published Jun. 17, 1997.

Monodisperse particle size distributions are moreover important when latexes are used in inks, e.g. flexo, off-set and ink-jet inks. For ink-jet inks the jetability will also depend on the particle size distribution. Applications of polymer latexes in ink-jet inks have been disclosed e.g. in:

Pigmented water-based ink-jet ink with improved water and abrasion resistance. Iijima, Hirotaka. (Konica Corporation, Japan) in EP-A 1 074 589, published Feb. 7, 2001.

Solvents that enhance the printability and drop ejection of inks containing latex polymers. Rehman, Zia. (Hewlett-Packard Co., USA) in EP-A 1 029 904, published Aug. 23, 2000.

When polymer latexes are used in order to prepare a printing plate making use therefor from ink-jet techniques, unimodal particles also facilitate jetability. Attempts in order to improve the said jetability have e.g. been described in EP-A's 0 976 550 and 0 963 841.

A quite novel application is the use of monodisperse particles, prepared by the method according to the present invention, in photonic crystals. Periodic super-structures diffract electro-magnetic radiation if the lattice constant matches the wavelength of light. The most popular structure under study is opal—a face-centered cubic (fcc) package of silica spheres, several hundreds of nanometers in diameter. Owing to Bragg reflection of light all these materials show "opalescent" colors. From a physical point of view they can be considered as incomplete photonic crystals. Omni-directional photonic crystals are thought to suppress the density of phonic states in certain frequency windows. By analogy with the electronic energy band gap structure these windows are named "photonic bandgaps". These materials potentially offer unique opto-electronic properties. Well-ordered three-dimensional photonic crystals based on polystyrene beads are known. PMMA beads can also be used and have the advantage to be suitable for use as an electron-beam resist. Another very important factor is the refractive index contrast. By using different types of monomers one might vary the refractive index of the particle. In order to obtain unimodal particle size distribution subsequently repeated purifications are required (filtration and centrifugation). The highly charged, monodisperse colloidal particles readily self-assemble into robust three-dimensionally ordered crystalline colloidal arrays (CCAs). These CCAs operate as photonic crystals that Bragg diffract light in the UV, visible, and IR regions of the spectrum.

Synthesis of Highly Charged, Monodisperse Polystyrene Colloidal Particles for the Fabrication of Photonic Crystals. Reese, Chad E.; Guerrero, Carol D.; Weissman, Jesse M.; Lee, Kangtaek; Asher, Sanford A., J. Colloid Interface Sci. (2000), 232(1), 76–80.

Dye-containing polymer beads as photonic crystals. Mueller, Manfred; Zentel, Rudolf; Maka, Torsten; Romanov, Sergei G.; Torres, Clivia M. Sotomayor. Chem. Mater. (2000), 12(8), 2508–2512.

Monodispersed colloidal spheres: Old materials with new applications. Xia, Younan; Gates, Byron; Yin, Yadong; Lu, Yu. Adv. Mater. (Weinheim, Ger.) (2000), 12(10), p.693–713.

Tuning the photonic bandgap properties of crystalline arrays of polystyrene beads by annealing at elevated temperatures. Gates, Byron; Park, Sang Hyun; Xia, Younan, Adv. Mater. (Weinheim, Ger.) (2000), 12(9), 653–656.

Self-assembly of colloidal particles into three-dimensionally ordered arrays and its applications. Gates, Byron; Park, Sang Hyun; Xia, Younan. Proc. SPIE-Int. Soc. Opt. Eng. (2000), 3937 (Micro- and Nano-photonic Materials and Devices), 36–43.

The fabrication and band-gap engineering of photonic multilayers, Jiang, Peng, Ostojic, Gordana N., Narat, Roxana, Mittleman, Daniel M. and Colvin, Vicky L., Adv. Mater. (Weinheim, Ger.) (2001), 13(6), 389–393.

Self-assembly approaches to three-dimensional photonic crystals, Xia, Younan, Gates, Byron, and Li, Zhi-Yuan, Adv. Mater. (Weinheim, Ger.) (2001), 13(6), 409–413.

Production and use of core-shell polymer particles. Rupaner, Robert; Leyrer, Reinhold J.; Schumacher, Peter. (BASF Aktiengesellschaft, Germany); EP-A 0 955 323.

Producing pigment particles of defined shape and size. Etzbach, Karl-Heinz; Keller, Harald; Leyrer, Reinhold; Faust, Tillmann; Schuhmacher, Peter; Siemensmeyer, Karl. (Basf Aktiengesellschaft, Germany); WO 98/12265.

A novel application of such photonic crystals based on monodisperse polymer latexes is its use in a temperature-sensitive label, e.g. for food packaging. E.g. when a monodisperse latex is prepared from butylmethacrylate, one obtains a photonic crystal showing colors due to the Bragg refections only when film has undergone no film formation (below 27° C.). Therefor such films such should not be dried above their film forming (or glass transition) temperature. When the color of the film dissapears, one knows that the film has been above the glass transition temperature. For example polybutylmethacrylate spheres have a glass transition temperature of about 27° C. One could make a label of such a photonic crystal based on poly(butylmethacrylate). If the color disappears one knows that the label has not always been kept below 27° C. One could use such a temperature sensitive label e.g. on food which should be kept cold. By variation of the co-monomer ratios it is feasible to prepare such temperature detection labels for temperatures between 0 and 135° C. The color of the label can be adjusted by varying the particle size.

Another application of monodisperse particles, prepared by the method of the present invention, is its use as spacers in display applications, spacers being described e.g. in following patent applications:

Spacer for liquid crystal display element. Takechi, Masahiro; Ito, Kazushi. (Sekisui Chemical Co., Ltd., Japan). JP-A 2000347196, published Dec. 15, 2000.

Spacers for use in liquid-crystal display devices and their manufacture. Ochitani, Yukio; Takechi, Masahiro; Ito, Kazushi. (Sekisui Chemical Co., Ltd., Japan). JP-A 2000321582, published Nov. 24, 2000.

Manufacture of porous fine particles for spacers of liquid crystal displays and packings of column chromatography. Nagai, Yasuhiko; Minamino, Hiroko(Sekisui Chemical Co.,Ltd., Japan); JP-A 2000191818, published Jul. 11, 2000.

Liquid-crystal display devices and spacers for use in the devices. Takechi, Masahiro; Ochitani, Yukio; Uematsu, Yasushi. (Sekisui Fine Chemical Co.,Ltd., Japan); JP-A 2000147518, published May 26, 2000.

Manufacture of monodisperse seed particles, microparticles, and spacers for liquid crystal display elements. Minamino, Hiroko; Nagai, Yasuhiko (Sekisui Chemical Co.,Ltd., Japan); JP-A 2000103804, published Apr. 11, 2000.

Dependence of substrate deflection on spacer pitch in emissive flat panel displays. Cho, Y. -R.; Kim, H. -S.; Oh, J. -Y.; Mun, J. -D.; Choi, J. -O.; Lee, J. H.; Cho, K. -I.; Ahn, S. Mater. Sci. Eng., B (2000), B77(1), p. 6–10.

Electrophoretic medium provided with spacers; Albert, Jonathan D. (E Ink Corporation, USA); WO 01/02899, published Jan. 11, 2001.

Application in dry and liquid developers and toner for printing applications for polymer particles prepared according to the method of the present invention is another application. Patent applications related therewith are e.g. following:

Preparation of monodisperse acrylic particles of controlled size by emulsion polymerization. Paine, Anthony J.; Rudin, Alfred; Vlad, Florin. (Xerox Corporation, USA) in U.S. Pat. No. 5,902,853.

Applications e.g. biomedical applications, wherein polymer particles prepared by the method of the present invention are useful, have been described in:

Monosized polymer particles in biochemical and biomedical separations. Ugelstad, J.; Stenstad, P.; Kilaas, L.; Prestvik, W. S.; Herje, R.; Berge, A.; Hornes, E., Blood Purif. (1994), Volume Date 1993, 11(6), 349–69.

Monosized polymer particles in biochemical and biomedical separations. Ellingsen, Turid; Aune, Oddvar; Berge, Arvid; Kilaas, Lars; Schmid, Ruth; Stenstad, Per; Ugelstad, John; Hagen, Steinar; Weng, Ellen; Johansen, Liv., Makromol. Chem., Macromol. Symp. (1993), 70–71(34th International Symposium on Macromolecules, 1992), 315–26).

Biochemical and biomedical application of monodisperse polymer particles. Ugelstad, John; Stenstad, Per; Kilaas, Lars; Prestvik, Wenche S.; Rian, Anne; Nustad, Kjell; Herje, Ragnhild; Berge, Arvid., Macromol. Symp. (1996), 101(5th International Polymer Conference "Challenges in Polymer Science and Technology", 1994), 491–500.

New developments in biochemical and medical applications of monodisperse polymer particles. Ugelstad, J. Adv. Org. Coat. Sci. Technol. Ser. (1991), 13, 507–18.

Manufacture of polystyrene latexes with monodisperse particle size for immunological tests. Grickowa, Innesa; Gusiew, Siergiej; Grzywa, Edward; Legocki, Marian; Kraszeninnikowa, Irina. (Instytut Chemii Przemyslowej, Pol.); PL 163091 B1, issued Feb. 28, 1994.

Applications related with column packing, wherein polymer particles prepared by the method of the present invention are useful, are, e.g.:

Monodisperse particles, their manufacture and use for packing a liquid chromatography column. Muranaka, Kazuaki; Tsuda, Teruhiko. (Tosoh Corporation, Japan). EP-A 1 046 658, published Oct. 25, 2000.

Applications in Microfiltration (MF) and Ultrafiltration (UF) membranes, wherein polymer particles prepared by the method of the present invention are useful, are, e.g.:

Porous latex composite membranes fabrication and properties. Jons, Steve; Ries, Paul; McDonald, Charles J., J. Membr. Sci. (1999), 155(1), 79–99.

Other applications wherein polymer particles prepared by the method of the present invention are useful, are, e.g: application of monodisperse polymer particles in manufacturing impact-resistant plastics, antistatic finishes, toners, etc., related with e.g.

Monodisperse dilatant polymer dispersions and their preparation. Rupaner, Robert; Horn, Frank M.;

Richtering, Walter; Muelhaupt, Rolf. (BASF A. -G., Germany). Ger. Offen. DE 19757669, published Jan. 7, 1999.

Manufacture of colored polymer particles for electrophotographic toners or for immunoassay carriers. Hayashi, Kenji; Koizumi, Yoshiaki; Kamyama, Mikio; Takahashi, Jiro. (Konishiroku Photo Ind, Japan). JP-A 05-247108, published Sep. 24, 1993.

Use of monodisperse polymer particles according to the present invention in inks or toners, in photonic crystal films, in thermal printing plates for computer-to-plate or computer-to-press applications, in inkjet media, in displays or in photographic films as well as use as a spacing agent opens new horizons for quite a lot of applications. It is clear however that the list, presented hereinbefore, is not exhaustive.

EXAMPLES

While the present invention will hereinafter be described in connection with preferred embodiments thereof, it will be understood that it is not intended to limit the invention to those embodiments.

deaerated by bubbling with nitrogen for 10 minutes. Then, the initiator was added and the flasks were sealed with rubber septums and the solutions were heated under stirring for another minute. Then, 5 ml (4.5 g) of styrene or MMA were added dropwise via syringes over a period of 2 hours to the stirred solutions while maintaining the temperature at 80° C. After completing the addition of the monomers, the reaction mixtures were heated at 85° C. for an additional hour.

Particle sizes as listed in the Tables 1 and 2 were measured by means of light-scattering using a "Brookhaven Instruments Particle sizer BI90". The pictures taken by means of scanning electron microscopy (SEM) were obtained according to the following method. Samples were diluted in distilled water. A drop of this solution was put on a substrate, dried, and covered with a thin gold-coating. The sample was then examined in a JEOL JSM-5600 Scanning Electron Microscope with an accelerating voltage of 30 kV.

TABLE 1

Polymerization of MMA under semi-continuous conditions in the presence of different amounts of randomly methylated β-cyclo-dextrin (RAMEB)

| Example | RAMEB [g] | Water [g] | $K_2S_2O_8$ [g] | MMA [g] | $\overline{Mn}$ g/mol | PD | APS [nm] | PSD |
|---|---|---|---|---|---|---|---|---|
| 1 (comp.) | 0 | 50 | 0.05 | 4.7 | 32000 | 2.2 | 292 | Less narrow |
| 2 (inv.) | 0.25 | 50 | 0.05 | 4.7 | 31000 | 2.13 | 297 | Narrow |
| 3 (inv.) | 0.5 | 50 | 0.05 | 4.7 | 37000 | 2.06 | 517 | Narrow |
| 4 (inv.) | 1.0 | 50 | 0.05 | 4.7 | 32000 | 2.28 | 588 | Narrow |

APS = Average Particle Size
PSD = Particle size distribution
PD = Polydispersity index

TABLE 2

Polymerization of styrene under semi-continuous conditions in the presence of different amounts of randomly methylated β-cyclodextrin (RAMEB)

| Example | RAMEB [g] | Water [g] | $K_2S_2O_8$ [g] | Styrene [g] | $\overline{Mn}$ g/mol | PD | APS [nm] | PSD |
|---|---|---|---|---|---|---|---|---|
| 5 (comp) | 0 | 50 | 0.05 | 4.5 | 62000 | 6.46 | 403 | Broad |
| 6 (inv.) | 0.25 | 50 | 0.05 | 4.5 | 41000 | 4.02 | 358 | Narrow |
| 7 (inv.) | 0.5 | 50 | 0.05 | 4.5 | 33000 | 3.07 | 267 | Narrow |
| 8 (inv.) | 1.0 | 50 | 0.05 | 4.5 | 39000 | 2.77 | 318 | Narrow |

Comparative Examples 1 and 5

Polymerization of Methylmethacrylate (MMA) or styrene in the absence of RAMEB under semi-continuous conditions

Inventive Examples 2–4 and 6–8

Polymerization of MMA or Styrene in the presence of different amounts of RAMEB under semi-continuous conditions General Polymerization Procedure 100 ml flasks, equipped with magnetic stirring bars were each charged with 50 ml of water. Then, randomly methylated β-cyclodextrin (RAMEB, Wacker Cavasol W7M, trademark product from WACKER, Germany) was added in different amounts to each flask, according to the data given in Table 1 or 2. The solutions were heated to 80° C. and

Comparative Examples 9 and 10

Similar reactions as those described in examples 4 and 8, using either styrene or MMA as a monomer with 10 wt % of cycodextrin (RAMEB), now preformed batch-wise gives coagulation.

Comparative Examples 11 and 12

Repeating the reaction using the monomer butyl-methacrylate and 5.3% of β-CD without the Dowfax 2A1 surfactant as described by Rimmer in Polymer 40 (1999) 6673–6677, gave about 5.1% of coagulum. Performance of the same reaction with semi-continuous addition of monomer, results in less than 1.5% of coagulum. As observed also in Examples 1–8, it was also noticed that the semi-continuous reaction gave a more narrow molecular weight distribution:

batch Mn=115.000 g/mole, PD=4.2;
semi-continuous Mn=120.000 g/mole, PD=2.6.

Indicated molecular weights were obtained from GPC, using polystyrene standards, and THF as an eluens.

Indicated molecular weights, shown in table 1 and table 2 were obtained from GPC, using polystyrene or PMMA standards, and Chloroform as an eluent.

Indicated molecular weights from PBMA (examples 11 and 12) were obtained from GPC, using polystyrene standards and DMF with 0.1 weight % LiCl as an eluent.

From these examples it can be clearly concluded that a semi-continuous procedure gives much better results if compared with batch-wise reactions in order to reach the objects of the present invention, wherein use is made of cyclodextrin in heterogeneous polymerization reactions, such as emulsion polymerizations or dispersions polymerizations, more particularly in order to obtain a more narrow particle size distribution. The cyclodextrin mediated hetereogeneous polymerization reaction with a semi-continuous addition of the monomer moreover gives a much better colloidal stability of the said particles having a more narrow particle size distribution. In the absence of other surfactants, and more preferably in the absence of (an)ionic surfactants, the cyclodextrin mediated heterogeneous polymerization avoids nucleation from different types of micelles, whereas persulfate as an initiator is advantageously used in order to give the formed latex additional stability.

Having described in detail preferred embodiments of the current invention, it will now be apparent to those skilled in the art that numerous modifications can be made therein without departing from the scope of the invention as defined in the appending claims.

What we claim is:

1. Method of preparing monodisperse polymer particles by free radical polymerization or copolymerization of hydrophobic monomers in a water-based system in the presence of cyclodextrin, wherein said free radical polymerization is performed with a semi-continuous addition of monomer, wherein an initiator and cyclodextrin are added to said water-based system prior to addition of said monomer, and in that a total solid contents is present of less than 30% by weight in said water-based system.

2. Method according to claim 1, wherein preparing monodisperse polymer particles by free radical polymerization or copolymerization of hydrophobic monomers in a water-based system proceeds in the presence of β-cyclodextrin.

3. Method according to claim 1, wherein said free-radical polymerization is initiated by a persulfate initiator.

4. Method according to claim 1, wherein said free-radical polymerization is performed via seeded emulsion or dispersion polymerization.

5. Method according to claim 1, wherein said polymerization is performed in the absence of addition of any ionic surfactant.

6. Method according to claim 1, wherein said hydrophobic monomer is a compound selected from the group consisting of styrenics, acrylonitrile, methacrylonitrile, acrylates, methacrylates, methacryl amides, acrylamides, vinylamide, maleimides, vinyl ethers, vinyl esters, monoalkymaleates, dialkyl maleates, fluorinated acrylates, fluorinated methacrylates, dienes and derivatives thereof.

7. Method according to claim 1, wherein said hydrophobic monomer is a compound selected from the group consisting of styrene, methylmethacrylate, N-phenyl maleimide, divinylbenzene, ethyleneglyol diacrylate, 2,2,2-trifluoroethylacrylate 2,2,2-trifluoroethyl methacrylate, vinylcaprolactam, acrylonitrile, vinyl acetate, N-benzyl methacrylamide, N-benzyl maleimide and vinyl versatate.

8. Method according to claim 1, wherein said monodisperse polymer particles have an average particle size between 0.02 μm and 20 μm.

9. A process for preparing monodisperse polymer particles by free radical polymerization or copolymerization of hydrophobic monomers comprising the steps of:

forming an aqueous solution of cyclodextrin and initiator; and adding said hydrophobic monomer to said aqueous solution semi-continuously; wherein said aqueous solution comprises a total solid contents of less than 30% by weight and measuring a particle size.

10. The process for preparing monodisperse polymer particles by free radical polymerization or copolymerization of hydrophobic monomers of claim 9, wherein said cyclodextrin is β-cyclodextrin.

11. The process for preparing monodisperse polymer particles by free radical polymerization or copolymerization of hydrophobic monomers of claim 9, wherein said intiator is a persulfate initiator.

12. The process for preparing monodisperse polymer particles by free radical polymerization or copolymerization of hydrophobic monomers of claim 9, wherein said free-radical polymerization is performed via seeded emulsion or dispersion polymerization.

13. The process for preparing monodisperse polymer particles by free radical polymerization or copolymerization of hydrophobic monomers of claim 9, wherein said polymerization is performed in the absence of addition of any ionic surfactant.

14. The process for preparing monodisperse polymer particles by free radical polymerization or copolymerizat ion of hydrophobic monomers of claim 9, wherein said hydrophobic monomer is a compound selected from the group consisting of styrenics, acrylonitrile, methacrylonitrile, acrylates, methacrylates, methacryl amides, acrylamides, vinylamide, maleimides, vinyl ethers, vinyl esters, monoalkymaleates, dialkyl maleates, fluorinated acrylates, fluorinated methacrylates, dienes and derivatives thereof.

15. The process for preparing monodisperse polymer particles by free radical polymerization or copolymerization of hydrophobic monomers of claim 9, wherein said hydrophobic monomer is a compound selected from the group consisting of styrene, methylmethacrylate, N-phenyl maleimide, divinylbenzene, ethyleneglyol diacrylate, 2,2,2-trifluoroethylacrylate, 2,2,2-trifluoroethyl methacrylate, vinylcaprolactam, acrylonitrile, vinyl acetate, N-benzyl methacrylamide, N-benzyl maleimide and vinyl versatate.

16. The process for preparing monodisperse polymer particles by free radical polymerization or copolymerization of hydrophobic monomers of claim 9, wherein said monodisperse polymer particles have an average particle size between 0.02 μm and 20 μm.

* * * * *